United States Patent [19]
Strömmer

[11] Patent Number: 5,848,123
[45] Date of Patent: Dec. 8, 1998

[54] METHODS AND APPARATUS FOR USE IN IMAGING AN OBJECT

[75] Inventor: Pekka Strömmer, Espoo, Finland

[73] Assignee: Planmed Oy, Finland

[21] Appl. No.: 754,524

[22] Filed: Nov. 21, 1996

[30] Foreign Application Priority Data

Nov. 21, 1995 [FI] Finland ................................. 955598

[51] Int. Cl.⁶ .................................................. H05G 1/64
[52] U.S. Cl. ..................................... 378/98.8; 250/370.09
[58] Field of Search ........................ 378/98.8; 250/370.09

[56] References Cited

U.S. PATENT DOCUMENTS

| | | |
|---|---|---|
| 4,188,537 | 2/1980 | Franke . |
| 4,383,327 | 5/1983 | Kruger ................................... 378/98.8 |
| 5,216,250 | 6/1993 | Pellegrino et al. . |
| 5,272,535 | 12/1993 | Elabd . |
| 5,289,520 | 2/1994 | Pellegrino et al. . |
| 5,365,562 | 11/1994 | Toker . |
| 5,426,685 | 6/1995 | Pellegrino et al. . |
| 5,526,394 | 6/1996 | Siczek ................................... 378/98.8 |

FOREIGN PATENT DOCUMENTS

| | | |
|---|---|---|
| 634671 | 1/1995 | European Pat. Off. . |
| WO 91/09495 | 6/1991 | WIPO . |

OTHER PUBLICATIONS

D. J. Burt, "Development of X–Ray CCDs", Proceedings of ESA Symposium, Dec. 1992, Hirst Research Centre, GEC–Marconi Limited.

D. J. Burt, et al., Investigation of 'Dither Mode' Clocking, Dec. 1993, Hirst Research Centre, GEC–Marconi Limited.

Primary Examiner—Craig E. Church
Attorney, Agent, or Firm—Jones & Askew

[57] ABSTRACT

The present invention concerns methods and apparatuses for imaging an object by detecting radiation reflected from and/or transmitted through the object (O;P;M) using an imaging sensor system. To perform an optimized selection between the imaging resolution and the sensitivity of the imaging sensor, the sensor system is configured by means of a control scheme based on combining, or binning, the radiation-responsive imaging elements of the imaging sensor along the rows and/or columns of the sensor matrix into clusters of a plurality of imaging elements. The sensor pixel charges, which represent the image information obtained from the individual imaging elements of said clusters, are straightforwardly binned into the clusters in their charge form. According to a second method of the invention, the TDI-mode imaging technique is applied and a mutual, relative motion is arranged between object to be imaged and the imaging sensor. The charge-mode image, which is formed from the object to be imaged on the CCD sensor elements, is transferred at the same speed with said relative movement and the image information gathered from the object is accumulated for an extended time simultaneously achieving an increased sensitivity of the sensor. The physical pixel size of the sensor is selected smaller than that required to achieve the maximum resolution required from sensor and that the image blur caused by the relative movement between the object to be imaged and the imaging sensor is reduced by shifting the pixel charges in synchronized steps corresponding to the physical size of the CCD sensor pixels, whereby the tracking of the relative movement between the object to be imaged and the CCD sensor occurs with maximum accuracy.

20 Claims, 8 Drawing Sheets

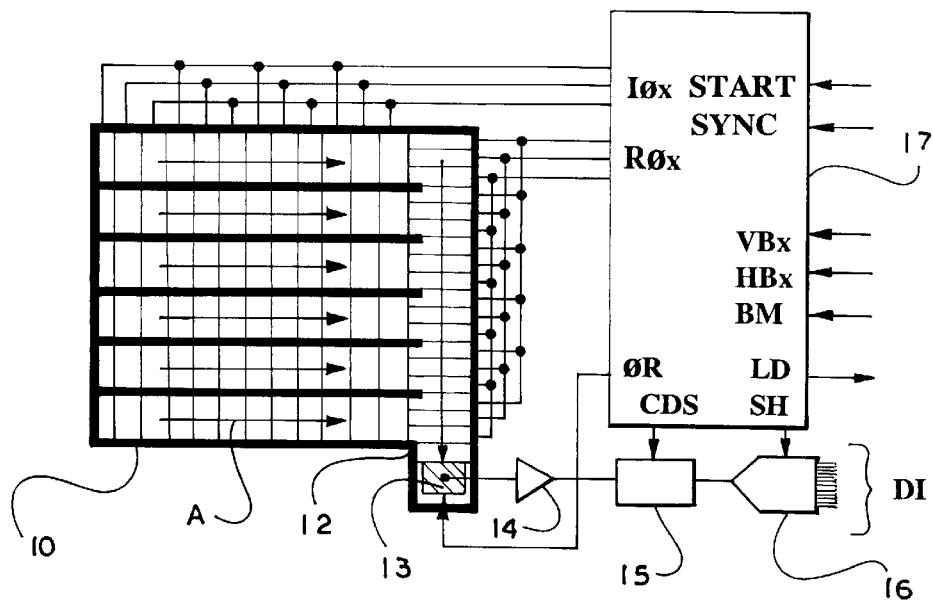
Fig_1
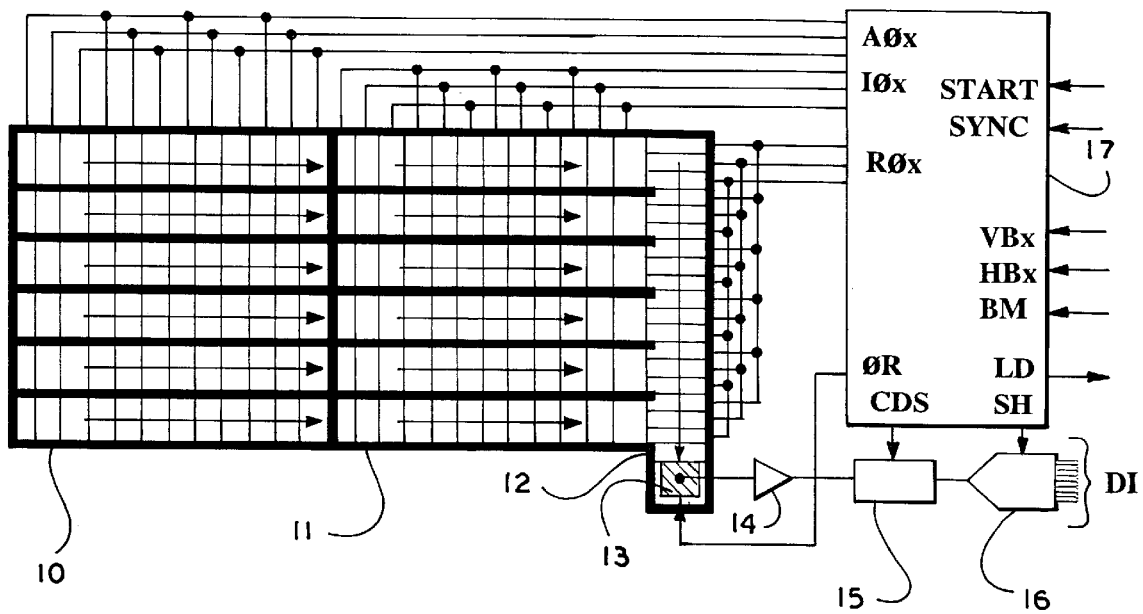
Fig_2

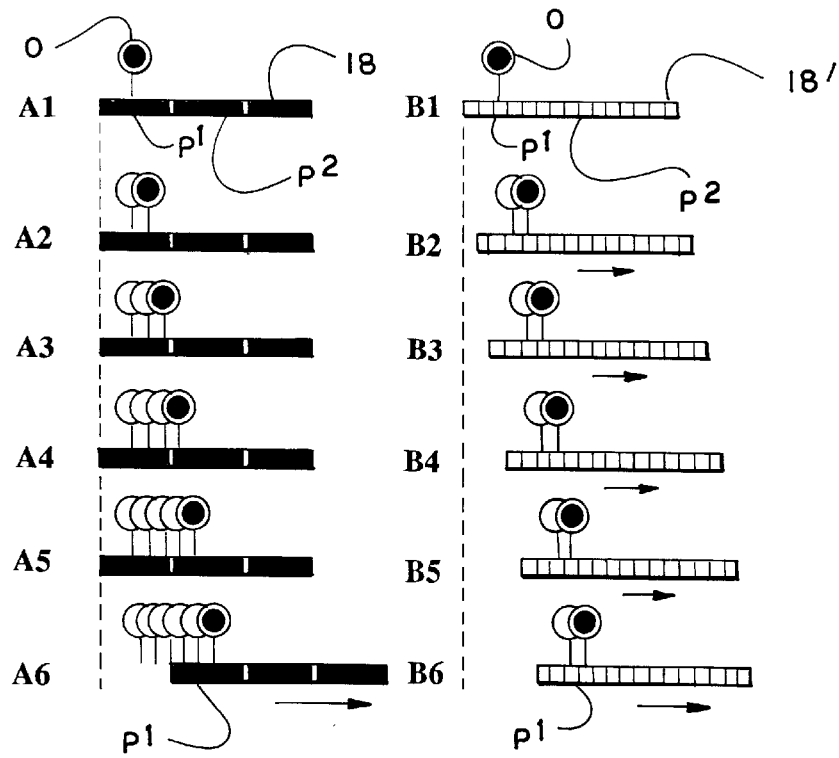
Fig_6
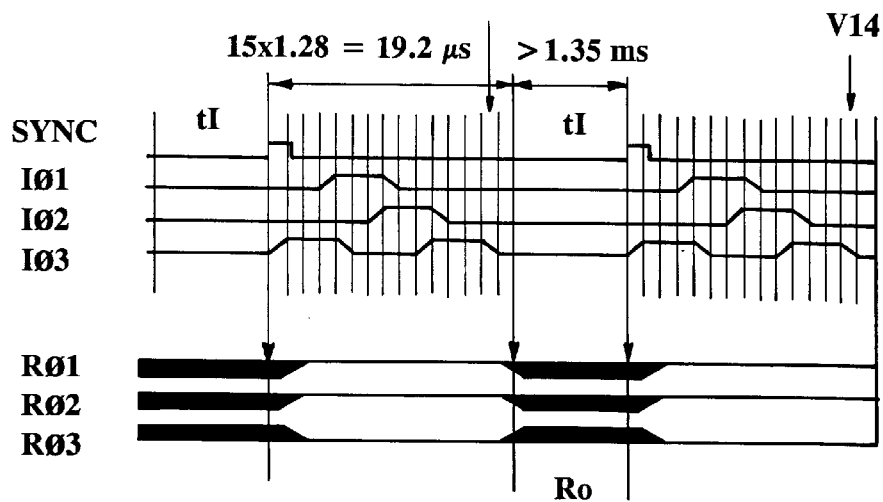
Fig_7

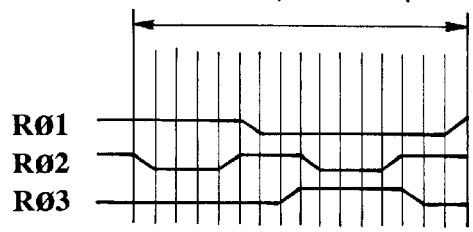
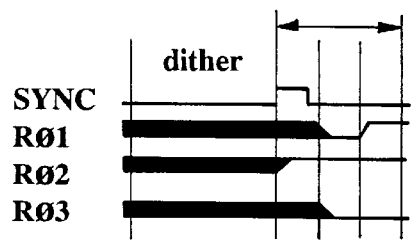
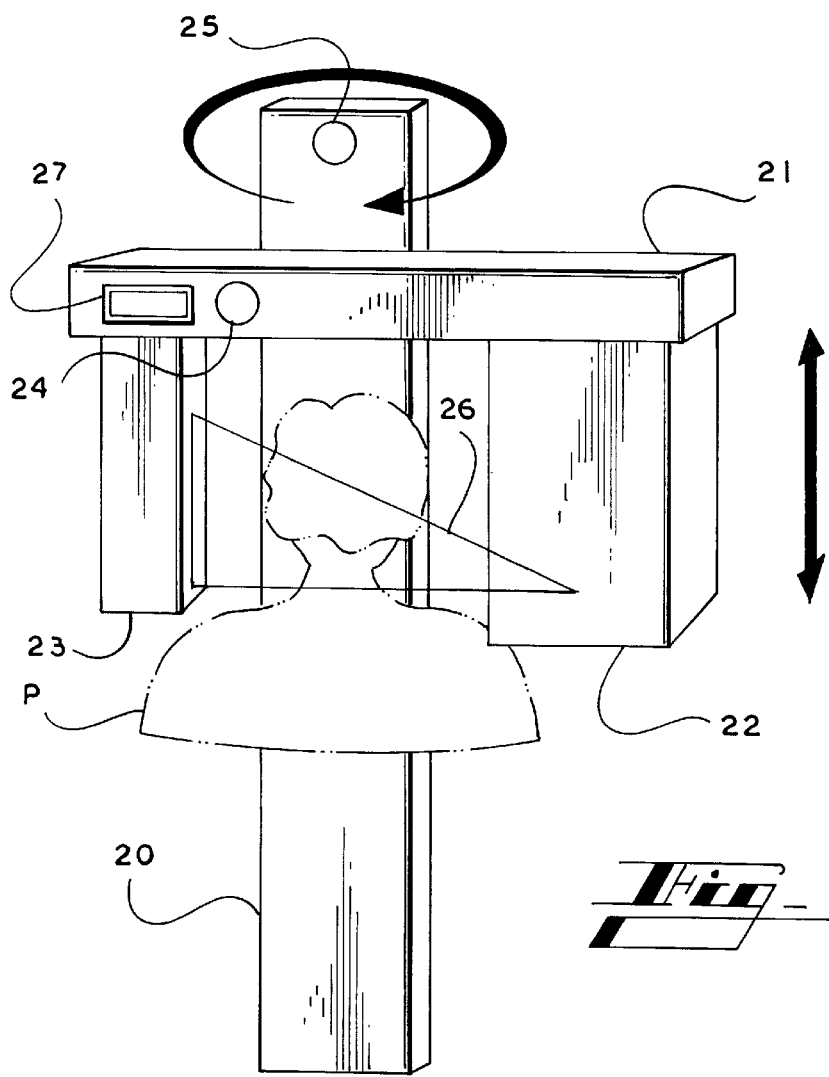

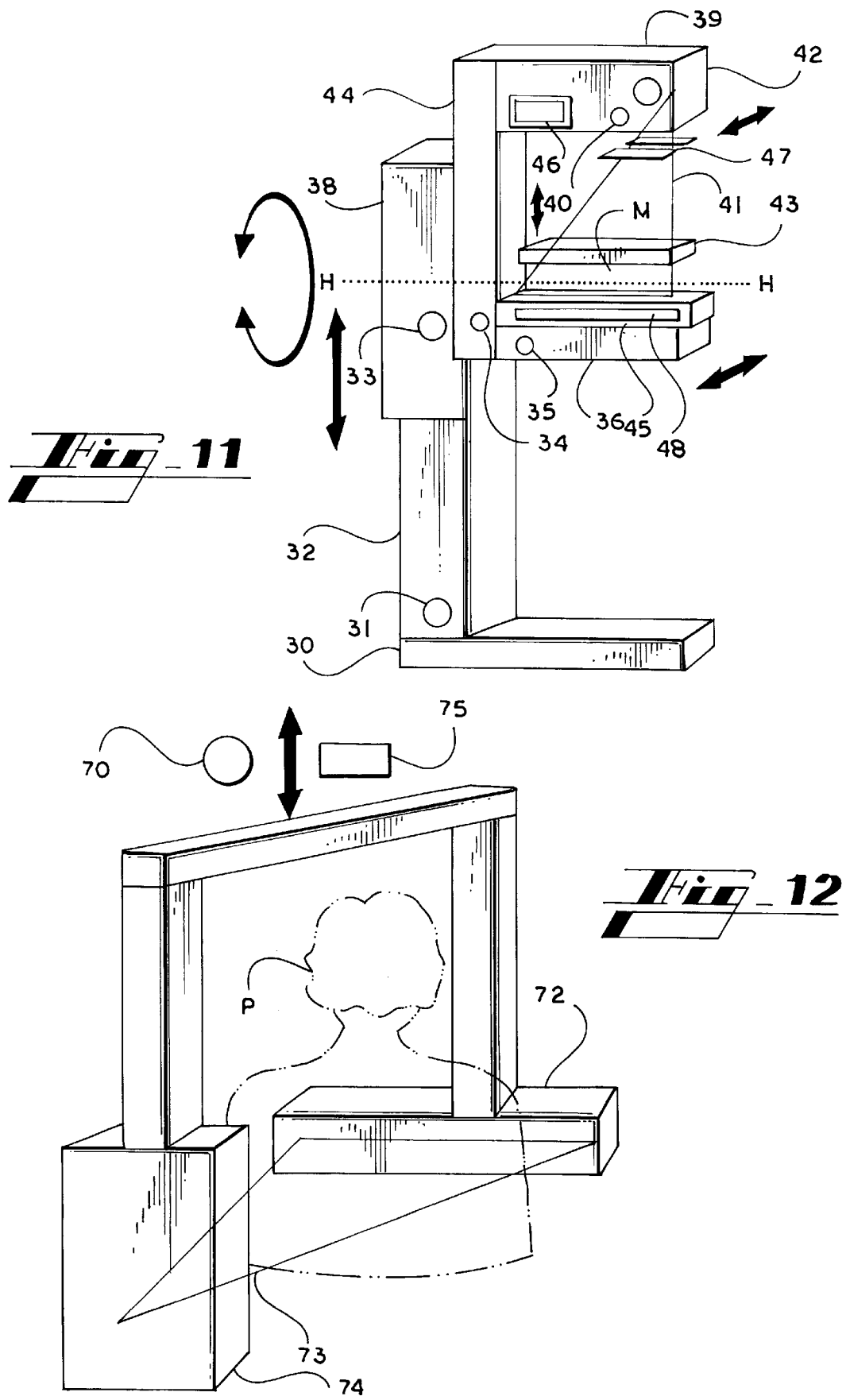

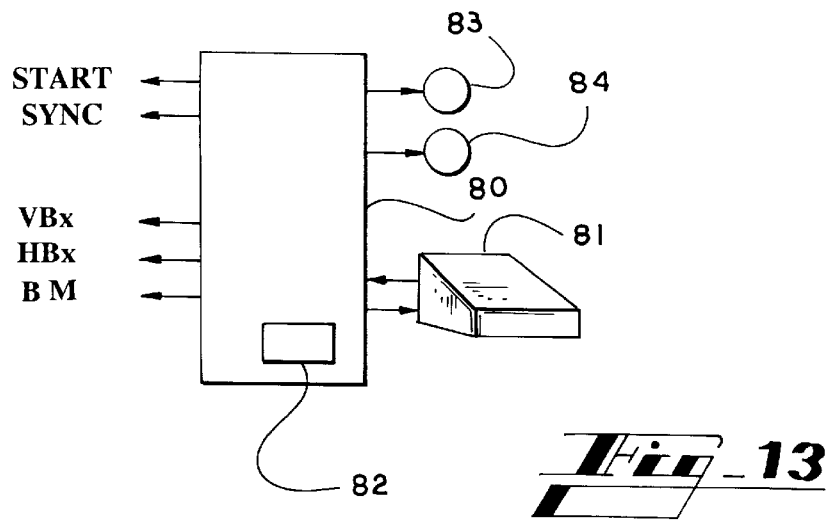
Fig_13
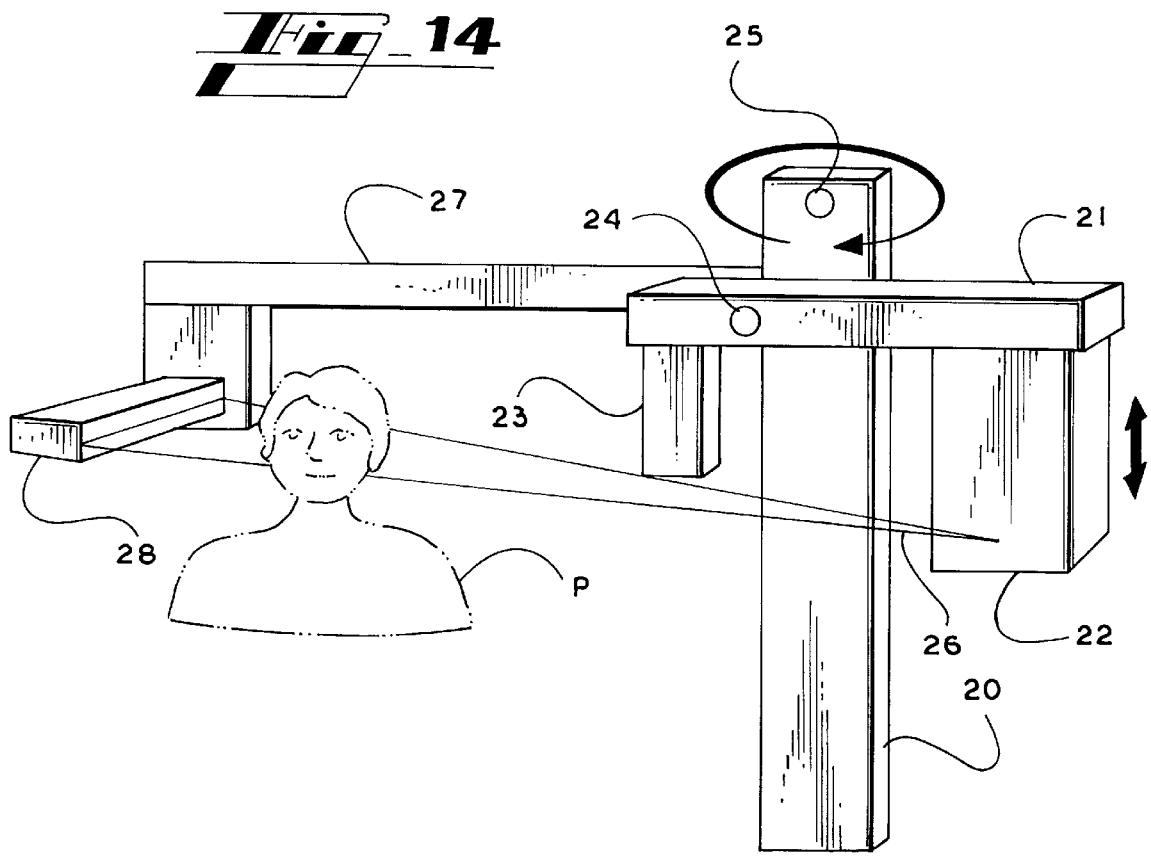
Fig_14

METHODS AND APPARATUS FOR USE IN IMAGING AN OBJECT

The present invention relates to methods for imaging an object with the help of electromagnetic radiation, in which method radiation reflected from and/or transmitted through an object is detected by a sensor system capable of delivering an electrical output signal conveying the image information obtained from the object and which sensor system includes a solid-state sensor comprised of a row-and-column fashion arrayed plurality of picture imaging elements, in short pixels.

Furthermore, the invention concerns apparatuses used in imaging objects, said apparatus including a unit capable of illuminating the object to be imaged with electromagnetic radiation, said apparatus further including a sensor system incorporating a solid-state sensor comprised of a row-and-column fashion arrayed plurality of picture imaging elements, in short pixels, and said apparatus further including means for conditioning and/or storing the electrical output signal obtained from said sensor system.

Thus, the present invention is broadly related to imaging by means of electromagnetic radiation. In particular, the invention is related to digital imaging utilizing a CCD sensor system.

Methods and apparatuses according to the invention are advantageously applied particularly ton medical radiography, particularly in dental panoramic radiography, mammography, or to fluoroscopy in general.

Conventionally, digital imaging may also be used in medical radiography, wherein it offers certain undeniable benefits over recording based on radiation-sensitive, processable film. Such benefits are those associated with the viewing, handling, storage and remote transfer of digitally recorded and stored images, whereby such benefits in the future will become ever more accentuated as the health care and hospital systems increasingly will adopt digital techniques in general and in the processing of radiographic images and similar information in particular. Additional benefits of digital imaging include minimized need for re-exposures and reduction of the radiation dose received by the patient as the solid-state sensors used in digital imaging have a higher sensitivity than graded-density films. Hence, it is a broad object of the present invention to contribute with a significant inventive step to such on-going development.

By their basic structure, solid-state sensors designed for digital imaging are planar devices comprised of small imaging element called pixels either arrayed into larger radiation-responsive areas or in the simplest form comprising a single-row linear sensor. Electromagnetic radiation such as light, infra-red radiation or x-rays absorbed at the active area of the imaging elements generates an electrical charge in the elements with a magnitude dependent on the intensity of radiation (that is, flux density and energy of absorbed quanta of impinging radiation) absorbed in the elements. Here, the magnitude of the electrical charge grows as a function of time, which means that during the exposure time, the imaging element integrates the electrical charge induced by the radiation impinging over the imaging element area, thus in principle giving a possibility of controlling the magnitude of the imaging element output signal through varying the integration time. However, it must be noted that the basic sensitivity of the sensor will not change even if the integration time is varied.

The most common sensor types known in the art of digital imaging are the photodiode matrix sensor and the CCD sensor. In the following, the structure of CCD sensors will be described in greater detail, since the present invention is not advantageously adaptable as such for use in conjunction with conventional diode matrix sensors.

In conventional CCD sensors, the electrical charge is kept stationary in the area of the imaging element during integration by means of an electric field, which may be formed with the help of either a conductor adapted to the center of imaging element and kept at a suitable potential form a potential well for electrons, or according to the latest techniques, by means of static charge fields formed by doping the borders of the imaging elements, whereby the charge fields raise a potential wall between the adjacent pixels. The use of charge fields formed by doping reduces the charge-handling capability of pixel, in short well capacity, which means that the pixels cannot hold as large a charge as actual potential wells, but instead the pixels will permit faster "overflow" of the their charge to the neighbouring pixels. Such charge fields have, however, certain benefits, because the voltage required for forming a potential well causes a dark current component, whereby into the pixel well leaks charge which is not induced by the actual impinging image-forming radiation. As a practical order of magnitude, it may be mentioned that the full-well capacity of a "conventional" pixel well in a commercial sensor device is approx. 700,000 electrons, while a "doped" pixel well has a capacity of approx. 400,000 electrons only. Respectively, the dark current component into a "conventional" pixel well is approx. 30,000 electrons per second, while the dark current component into a "doped" pixel well is as low as about 100 electrons per second. Prior to the development of the pixel well doping technique, reduction of the dark current component was attempted by cooling the sensor down to approx. −40° C., which is both cumbersome and expensive as well as likely to cause freezing and other problems.

In conventional CCD sensors, image readout occurs at the end of the integration time by transferring charge, which is accumulated into the area of the imaging pixel on the sensor photoplane, off from the pixel well under control of clock signals, thereby permitting the pixel to start immediately the accumulation of charge representing the next image frame. In a prior-art method known as TDI (Time Delay and Integration), the transferred charge is left in the adjacent pixel. In another prior-art method known as the FT (Frame Transfer) method, the charge is rapidly retransferred to a radiation-masked pixel storage area for the actual signal readout. During the readout of the image information recorded by the CCD sensor, the charges of the outermost pixel row of the image area in the TDI-mode sensor or of the masked area in an FT-mode sensor, respectively, are first transferred into a masked serial shift register comprised of a sensor-wide row of storage wells in which the charges transferred from the outermost well of each pixel column are kept apart from each other and wherefrom they are transferred one at a time by means of and under control of serial clock signals into the output well of the sensor. The output well is always emptied first, and subsequently thereinto is transferred the charge of a single pixel, the magnitude of which appears at the sensor output line as a voltage signal representing the image element information conveyed by said sensor pixel charge. In practical implementations of CCD sensors, the output signal voltage level is in the order of −3 $\mu$V/electron meaning that a charge of 500,000 electrons gives a sensor output voltage of −1.5 V.

Conventionally, the TDI imaging technique is utilized to perform imaging of a moving object with the maximum sensitivity achievable by means of CCD sensors. Instead of using to a sufficiently short exposure time for eliminating motion blur from the image as is known from photographic techniques, the TDI imaging method permits the motion of the object being imaged past the sensor, while simultaneously the charge-mode image formed on the sensor photoplane is transferred synchronously with the object motion, which means that the charge-mode image attempts to track the object. Thus, the image information formed from the object in the imaging elements can be accumulated for a longer time, meaning that the sensor sensitivity may easily be increased manifold. To image an object with maximum resolution in a conventional imaging system using a sensor of, e.g., 100 pixels long in the motion direction of the object, the exposure time need to be set so short as to prevent the image of object on the sensor photoplane from moving more than the width of a single pixel. By contrast, in a conventional TDI imaging method, the object image on the sensor photoplane is followed over the entire width of the photoplane, which in the exemplifying case permits accumulation of image information over the entire length of 100 pixels, whereby also the sensor output signal level will be 100-fold provided that the object velocity stays constant during this time. Thus, one of basic preconditions for the use of the TDI-mode imaging technique is the very fact that the instantaneous velocity of the object must be known to make it possible to follow the object successfully.

In the prior art, CCD image sensors and their control electronics were designed and optimized always separately for a certain application and specific use, whereby such conventional image sensor systems are ill fit for other applications no matter how similar. The development of new types of CCD sensors is extremely expensive and time-consuming. Typically, a new type of CCD sensor takes at least a year or more to develop involving an R&D budget of at least USD 1 million. Correspondingly, the development of control electronics for such a new CCD sensor takes about the same time, raising the system R&D costs by at least about USD 250,000. Given these facts, it is obvious that since the development of a new CCD sensor type presumes a commercial application with a potential of development cost payback within a reasonable time, applications using small quantities of CCD sensors cannot be implemented in practice within the constraints of a reasonable cost budget. On the other hand, while new CCD sensors are continually developed for applications of reasonably high volume, even in such projects the proportion of costs attributed to the CCD sensors rises relatively high when conventional techniques are used.

As the methods of conventional techniques have not permitted modification of CCD sensors and their control electronics individually optimized for each object to be imaged, it has been mandatory to perform imaging arrangements within the technical constraints of available equipment and their CCD sensors. In conventional imaging systems, the CCD sensor and its control electronics are optimized either for maximum resolution or sensitivity, or alternatively, compromises between resolution and sensitivity are made resulting in a generally satisfactory result. Tuning of CCD sensor resolution and sensitivity optimal for each imaged object, however, is of a particularly high importance in medical radiography, wherein a sufficient imaging resolution must be assured case by case, simultaneously minimizing the radiation dose received by the patient.

While modification of imaging resolution of CCD sensors by combining, or "binning", the pixels is known in the art, so far this approach has been utilized only with a constant binning ratio for each application, whereby a freely configurable binning ratio of CCD sensor pixels for optimal setting of imaging resolution and sensitivity individually for each object to be imaged has not been applied in the art.

Conventionally, imaging methods may process data from a sensor in digital format in the memory of a computer by, e.g., summing the contents of adjacent memory locations of a matrix, whereby the end result is principally equivalent to that of the above-mentioned "binning".

The art also recognizes the combination of a dental panoramic radiography apparatus with a cephalostat for skull imaging, and the digital implementation of such a combination apparatus is disclosed in, e.g., EP Pat. Appl. No. 0 634 671 A1.

With regard to the state of the art related to the present invention, reference is made to, e.g, the following exemplifying patent and application documents: U.S. Pat. Nos. 5,426,685, 5,289,520, 4,188,537, 5,365,562 and 5,216,250.

It is an object of the present invention to improve imaging techniques, and in particular, medical radiography techniques, in which CCD sensors and digital imaging are applied so that the above-described problems are essentially solved and their disadvantages overcome.

It is a particular object of the invention to improve imaging based on CCD sensors so that a wider dynamic range of CCD sensors over the prior art is achieved. This is important in such applications, in which an advantage is gained by trading image resolution against increased sensitivity of the CCD sensor. Such applications are found particularly in medical radiography techniques, in which the x-ray dose imposed on the patient is desiredly minimized and simultaneously the exposure times are minimized in order to reduce image blur caused by a possible movement of the patient.

To achieve these goals and others to be explained later, a first method according to the invention is principally characterized in that the sensor system is configured by means of a control scheme based on combining, or "binning", the radiation-responsive imaging elements of the sensor used in the sensor system along the rows and/or columns of the sensor matrix into clusters of a plurality of imaging elements, that the charges, which represent the image information obtained from the individual imaging elements of said clusters, are straightforwardly binned in their charge form and the electrical signal thus formed is taken to further processing and that said binning of imaging elements is performed under external control case by case according to the needs of each exposure individually, thereby performing a mutual optimization between the resolution and sensitivity of the sensor.

A second method according to the invention is principally characterized in that the method applies the TDI-mode imaging technique, whereby between the object to be imaged and the imaging sensor is arranged a mutual, relative movement, that the charge-mode image, which is formed from the object to be imaged on the CCD sensor elements, is transferred at the same speed with said relative movement and the image information gathered from the object is accumulated for an extended time simultaneously achieving an increased sensitivity of the sensor, that the physical pixel size of the sensor is selected smaller than that required to achieve the maximum resolution required from sensor and that the image blur caused by the relative movement between the object to be imaged and the imaging sensor is reduced by shifting the pixel charges in synchronized steps corresponding to the physical size of the CCD sensor pixels, whereby the tracking of the relative movement between the object to be imaged and the CCD sensor occurs with maximized accuracy.

While the second method according to the invention may be applied independently, it is most advantageously applied in conjunction with the first method according to the invention, which is the main invention claimed in this application.

Furthermore, a first apparatus according to the invention is principally characterized in that the apparatus comprises a configuration system for an imaging sensor system, said configuration system permitting the combination, or "binning", of the radiation-responsive imaging elements of the sensor used in the sensor system along the rows and/or columns of sensor matrix into clusters of a plurality of imaging elements and that the sensor system is so connected and controlled that the charges, which represent the image information obtained from the individual imaging elements of said clusters, may be straightforwardly binned in their charge form.

A second apparatus according to the invention is principally characterized in that the apparatus comprises a CCD imaging sensor system with its control system and apparatuses capable of providing a mutual, relative movement between the object to be imaged and said sensor system, that said control system is adapted to transfer the charge-mode image formed from the object to be imaged on the CCD sensor elements at the same speed with said relative movement, that the physical pixel size of the sensor is selected smaller than that required to achieve the maximum resolution required from sensor and that the image blur caused by the relative movement between the object to be imaged and the imaging sensor is reduced by shifting the pixel charges in synchronized steps corresponding to the physical size of the CCD sensor pixels, whereby the tracking of the relative movement between the object to be imaged and the CCD sensor occurs with maximum accuracy.

While the second method and apparatus according to the invention may be applied independently, they are most advantageously applied in conjunction with the first method and apparatus according to the invention as a synergistic combination.

When applying the first method and apparatus according to the invention, the pixel charges of the CCD sensor are summed inside the sensor device proper in charge form before they are converted into the output signal of the sensor, amplified and converted into digital form. Hence, the invention offers the benefit of eliminating summing noise and other error from the image information, which are disadvantages of conventional embodiments.

As the first method and apparatus according to the invention offer easy configuration of the CCD sensor and its control electronics, whereby the sensor system properties may be freely modified under program control within given limits so as to obtain an optimum system configuration for each application, the same CCD sensor type and control electronics can be used in a plurality of mutually essentially different applications. Thus, the quantities of the chosen CCD sensor type purchased for equipment manufacture can be increased and the R&D costs per application lowered to a more moderate level. On the user point of view, since a single CCD sensor and its control electronics may be used in a single installation for a plurality of purposes, and further, its different operating modes can eliminate the need for using a greater number of different CCD sensors, the total procurement costs of a given installation will remain essentially lower than those involved when purchasing equipment implemented using conventional techniques.

In addition to sensor cost savings, the invention provides the essential benefit that the sensitivity/resolution control gives, in addition to the imaging resolution control, also a possibility of controlling the radiation dose received by the patient, wherein compromises have been mandatory in the prior art.

In a preferred embodiment of the first method and apparatus according to the invention, the pixels may be combined, or "binned", into larger clusters both in the horizontal and vertical directions. For sake of clarity, the text above and later denotes the axes of the sensor element matrix as the horizontal and vertical directions, which must not be understood to be related to direction of the Earth's gravity field, but as is conventional in the art, the horizontal direction meaning the direction of charge transfer along the sensor element rows in the photoplane and the vertical direction meaning the column direction of the sensor elements in the photoplane, that is, a direction orthogonal to said horizontal direction, whereby the vertical direction in linear sensors, for example refers to the longitudinal direction along the sensor length. The binning of charges in the horizontal direction is arranged so that into the serial shift register are transferred the charges of a plurality of imaging element rows before charges of the serial shift register are read out from the sensor. Herein, the charges of a plurality of imaging element rows are dumped in the same "cup", that is, summed in a single well. In the vertical direction of the sensor, the "binning", or summing, of the charges is made by first clearing the output well and then transferring therein the contents of a plurality of charge wells of the serial shift register before the sensing of the sensor output voltage occurs.

The invention may be used in any such imaging application based on a CCD sensor that requires a wide dynamic range and can avail of trading imaging resolution against a higher sensitivity or vice versa. The most typical one of such applications is radiography, where the exposure times must be kept as short as possible in order to minimize image blur caused by movement of the patient and simultaneously to keep the radiation dose imposed on the patient at a minimized level. Resolution demands in radiography vary greatly according to the object being imaged, and it is customary in the art to increase the radiation dose to achieve a higher resolution. In fact, the implementation according to the invention makes it possible to cover a major part of the different sectors of radiography by virtue of the freely programmable configuration of the CCD sensor system according to the invention without essentially modifying the construction of the system. Particularly advantageous applications of the invention are found in the fields of mammography including its magnification and contact exposure modes, as well as combination apparatuses for dental panoramic radiography/cephalography. The application range of the invention can be extended into different department-level and chest fluoroscopy equipment.

In the first method and apparatus according to the invention, the control electronics of the CCD sensor is constructed so as to make it function under control of input signals which are capable of defining the "binning" ratio of the sensor pixels in the vertical and horizontal directions at any instant during an exposure, however, most advantageously always in the beginning of an exposure.

The invention is advantageously applied to a combination dental panoramic radiography/cephalography equipment so that the imaging resolution is made user-selectable, whereby overall views may be exposed with a lower resolution and radiation dose, while critical areas may be exposed with a higher resolution as necessary. In cephalography, a 2 lp/mm resolution is entirely sufficient, and herein, owing to the user-selectable resolution according to the invention, the exposure can be made with a radiation dose reduced down to 15% of that required in panoramic radiography at the same resolution. In practice the focus distance in cephalography is over three-fold with regard to that used in dental panoramic radiography (that is, 1700 mm vs. 480 mm), whereby the radiation intensity incident on the sensor after attenuation according to the square law of distance is only approx. 8% of the intensity received by the sensor in dental panoramic radiography. Accordingly, cephalography with the same sensor resolution as is used in dental panoramic radiography is almost impossible, because it would presume an exposure time extended up to tens of seconds, during which the patient being radiographed is expected to stay entirely still. In practice the panoramic exposures are made using the TDI scan at a speed of approx. 20 mm/s. To make the 240 mm long panoramic image of the skull using the same sensor resolution and same exposure parameters as are used in dental panoramic radiography, it would take 12 s×12.5=150 s, that is, two-and-half minutes with the same sweep speed.

According to a preferred embodiment of the invention, "magnification" radiographs in mammography are made as a contact exposure using a smaller pixel size than in normal mammography. Then, as will be evident from the description later in the text, a vastly improved resolution is attained over conventional magnification exposures using a fixed sensor pixel size. Moreover, this embodiment of the invention will do with a simpler and less costly x-ray source of a single focus size only. Further benefits are the shorter exposure times and reduced risk of image blur due patient movements and lower radiation dose received by the patient. When "magnification" radiographs are made in this embodiment of the invention using a smaller pixel size and contact exposures, "magnification" radiographs may also be made over the entire image area if necessary. By contrast, in the conventional technique of taking the object closer to the x-ray tube, a magnification factor of 2, for instance, makes so large an image on the recording medium as to permit only one-fourth of its area to be recorded. These ramifications and benefits of the invention will be described more closely later in the text.

In the following the invention will be examined in greater detail by making reference to the diagrams of appended drawings illustrating diagrammatically a few exemplifying embodiments of the invention, whereby the details of the diagrams must not be understood as limiting the scope of the invention, in which drawings FIG. 1 is a schematic block diagram of a CCD sensor system according to the invention with its control electronics adapted to TDI-mode imaging;

FIG. 2 is a schematic block diagram equivalent to that of FIG. 1 of a CCD sensor system according to the invention with its control electronics adapted to FT-mode imaging;

FIG. 6 is a sequence diagram of a preferred embodiment according to the invention adapted for motion tracking with full resolution in TDI-mode imaging;

FIG. 7 is a timing signal diagram of the TDI-mode imaging sequence shown in FIG. 6;

FIG. 8 is a timing signal diagram for a preferred embodiment according to the invention using "dithering" of the serial shift register contents for eliminating the dark current component;

FIG. 9 is a timing signal diagram of typical "dithering" clock signals for driving a three-phase-clocked sensor into the charge transfer state;

FIG. 10 is a schematic axonometric view of an embodiment of the invention adapted to a dental panoramic radiography apparatus;

FIG. 11 is a schematic axonometric view of an embodiment of the invention adapted to a mammography apparatus;

FIG. 12 is a schematic axonometric view of an embodiment of the invention adapted to a chest fluoroscopy apparatus;

FIG. 13 is a principally block diagram level outline of the control system for the sensor system according to the invention;

FIG. 14 is a schematic axonometric view of an embodiment of the invention adapted to a dental panoramic radiography apparatus equipped with a cephalostat for exposures in the cephalography mode;

Figure 3:
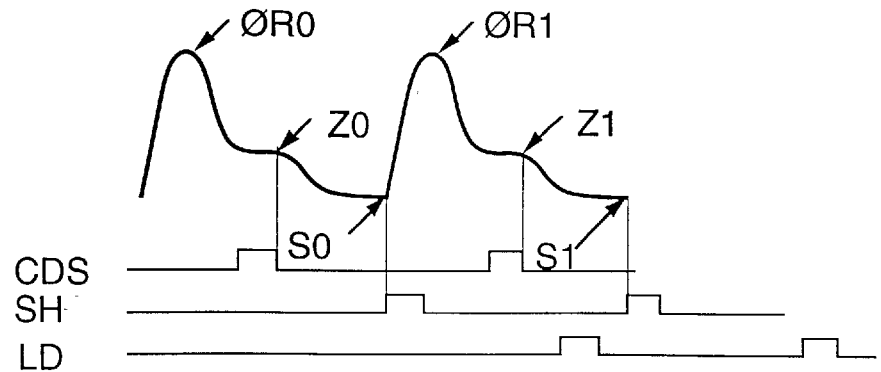
FIG. 3 is a timing signal diagram of a typical output signal of the CCD sensor system according to the invention.

Referring to FIG. 1, a TDI-mode CCD sensor system is diagrammatically shown therein together with the basic elements and functions of its control electronics. In the sensor system, the control electronics block 17 is interfaced to the imaging element matrix 10 of the CCD sensor by means of the IØx clock signals, the number of which typically is from two to four (2–4) and to a serial shift register 12 by the RØx clock signals, the number of which also typically being from two to four (2–4). The control electronics block 17 provides a control signal ØR for discharging the output well 13 of the CCD sensor. The charge of the output well 13 is converted into the sensor output voltage signal by means of an output amplifier 14 and then taken to a pixel charge zero-offset level correction stage 15 which under the timing of a control signal CDS from the control electronics block 17 sets the zero reference level separately for each pixel of the imaging element matrix 10 as will be described in detail later. After the zero-offset correction, the signal is taken to an analog/digital converter 16, which under the timing of a control signal SH from the control electronics block 17 converts the analog image information into digital format. The digital data DI are transferred to further storage and processing under the timing of a control signal LD from the control electronics block 17.

Referring to FIG. 2, an FT-mode CCD sensor system according to the invention is diagrammatically shown therein together with the basic elements and functions of its control electronics, which is otherwise equivalent to that of the TDI mode shown in FIG. 1 except that between the imaging element matrix 10, to which the control electronics block 17 is interfaced by the AØx clock signals, and the serial shift register 12 is adapted a storage element matrix 11 with dimensions identical to that of the imaging element matrix, whereby the control electronics block 17 is interfaced to this storage element matrix by the IØx clock signals.

The function of the sensor system described in the following concerns principally the TDI-mode sensor, and in principle, the functions of the FT-mode sensor differ therefrom only in that the transfer of charges from the storage element matrix 11 complementing the imaging element matrix 10 into the serial shift register 12 is always preceded by the transfer of charges from the imaging element matrix 10 into the storage matrix 11 under the timing of the AØx and IØx clock signals from the control electronics block 17. Additionally, the entire imaging element matrix of the FT-mode sensor occurs at the end of the integration time as a full-frame readout, instead of a row-by-row readout as is the case with the TDI-mode sensor in general.

The basics of a conventional CCD sensor and its control are outlined below, except for the novel functional and construction properties of the present invention which will be explained later in conjunction with the binning of pixels.

When starting an exposure imaged by means of a CCD sensor of FIG. 1 or 2, the initial charges possibly accumulated in the elements of the sensor matrix 10;10,11 must be removed and its pixel wells cleared. This is accomplished under the timing of start signal START from the control electronics block 17, whereby the charges of the imaging element matrix 10; 11 are transferred from one column at a time with the help of the IØx clock signals into the serial shift register 12. Next, the charges thus transferred into the serial shift register 12 are further transferred one at a time under control of the RØx clock signals to the output well 13, which is cleared by applying the ØR signal every time before the transfer of a charge. The clearing step may be repeated a few times if any doubt exists that the sensor wells will not be cleared completely during a single clearing step, depending on the magnitude of charges accumulated into the pixel wells. The start instant of an exposure is when charge representing image information begins to accumulate into the pixel wells of the cleared sensor matrix, that is, when radiation incident on the sensor photoplane begins to induce charge in its pixel wells. When the integration time counted by the control electronics block 17 is elapsed, or alternatively, when the external synchronization signal SYNC is applied, the charges of one column of the imaging element matrix 10;11 are transferred into the serial shift register 12 and therefrom further into the output well 13 as was described above. Now, differently from the preceding step, the charge of each pixel well 13 is sensed, whereby under control of the CDS signal supplied by the control electronics block 17, first the zero-offset level of each pixel charge is corrected and subsequently the analog output signal is converted under control of the SH signal into digital format by means of a converter 16, whose output signal after each conversion is further stored under control of the LD signal.

Figure 4:
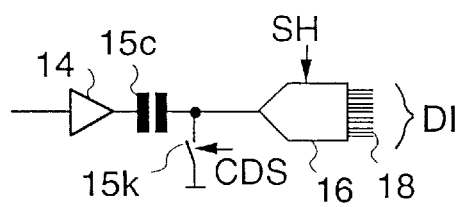
FIG. 4 is a circuit diagram of the arrangement for sensing the pixel-specific charge zero-offset level in the CCD sensor output signal.

Referring to FIG. 3, the typical output signal of a CCD sensor is shown therein. When the output well 13 is cleared with the help of the ØR signal, a large pulse ØR0 appears at the sensor output, after which the sensor output settles at instant Z0 to a certain level representing an empty output well. This pixel-specific charge zero-offset level is sensed for each well separately with the help of the CDS signal using, e.g., the circuit shown in FIG. 4. Here the CDS signal closes the switch 15k just before instant Z0, whereby the output end of the capacitor 15c is grounded and the signal base level present at the output of the sensor output amplifier 14 is charged into the capacitor 15c. At instant Z0, the switch 15k is opened and the pixel charged now transferred into the output well 13 of the sensor is now available as a signal level, which is sensed at instant S0 under control of the SH signal. In spite of the zero-offset level variations at instants Z0 and Z1, the circuit shown in FIG. 4 always senses the difference of the output signal levels at instants S0-Z0, S1-Z1, etc., that is, the corrected sensor output signal. The above-described function of the circuit is a conventional technique for these parts of the system and known in the art as Correlated Double Sampling.

When the pixels of the imaging element matrix 10;10,11 are combined in the horizontal direction according to the invention, the simplest approach thereto is that the column charges of the imaging element matrix 10;10,11 are transferred into the serial shift register 12 by more than one column before the charge transfer read-out from the serial shift register 12 is initiated. Then, the charges of multiple columns are binned, representing the total amount of charges from so many pixels as are thus summed into each well of the serial shift register 12. Since the internal transfer efficiency of a CCD sensor typically is as high as 99.9999%, such a summing of charges can be performed almost with a single-electron accuracy, which would be impossible in a summation external to the CCD sensor when taking into account the pixel-specific charge zero-offset level corrections, noise levels of amplifier stages and other possible error factors.

The control electronics block 17 according to the invention is provided with input lines HBx, under dynamic control of which it can transfer the number of column charges defined by these signals into the serial shift register 12 before the charge transfer read-out from the sensor is initiated. The invention is characterized in that the control electronics block 17 of the invention can perform the charge transfer from the imaging element columns as dynamically defined by the input signals HBx, that is, as required by the programmed sensor configuration.

The pixel charges of the imaging element matrix 10;11 are binned in the vertical direction according to the invention simplest so that the charges of the serial shift register 12 are transferred into the cleared output well 13 by more than a single pixel charge from the matrix 10; 11 before the sensing of the sensor output signal is initiated. Then, charges of multiple pixels are binned, or summed, representing the amount of charge accumulated on the imaging subarea which comprises so many pixels as are summed into the output well 13. Again, since the internal transfer efficiency of a CCD sensor typically is as high as 99.9999%, such a summing of charges can be performed almost with a single-electron accuracy, which would be impossible in a summation external to the CCD sensor when taking into account the pixel-specific charge zero-offset level corrections, noise levels of amplifier stages and other possible error factors.

Figure 5:
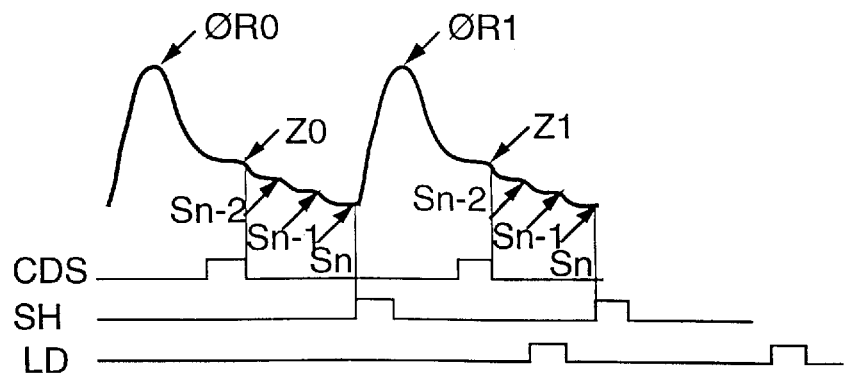
FIG. 5 is a timing signal diagram of the vertical summing of pixel charges in the output signal of the CCD sensor system.

Referring to FIG. 5, an example is shown therein of the output signal and control signals of a CCD sensor system according to the invention in the vertical-direction binning of the pixel charges. Following the clear pulse ØR0 of the output well 13, the pixel charge zero-offset level in the output signal is sensed with the help of the CDS signal applied at instant Z0. Subsequently, into the output well 13 are summed pixel charges at instants Sn-2, Sn-1 and Sn, after which the image sensor output signal is sensed with the help of the SH signal and the output well 13 is cleared for the next output sensing operation.

The control electronics block 17 according to the invention is provided with input lines VBx, under dynamic control of which the electronics block can transfer the number of pixel charges defined by the programmed sensor configuration into the output well 13 before the sensing of the output signal is initiated. The invention is characterized in that the control electronics block 17 used therein performs, in the beginning of the charge transfer cycle of any one serial shift register being read, the charge transfer of each individual serial shift register and the sensing of its output signal for the number of pixels to be "binned" as dynamically defined by the VBx signals, and thus, as required by the programmed sensor configuration. If the length of the serial shift register is not an integrally dividable with the defined number of pixels to be "binned", the control electronics block 17 commands such a number of empty pixel charges which is equal to the division remainder to be summed into the last sample of the output signal, whereby the row synchronization will not be lost.

The implementation according to the invention offers a free binning of the pixel charges of a CCD sensor under freely programmable control into clusters of desired dimension separately in both horizontal and vertical directions as required by the programmed sensor configuration. If a sensor of sufficiently small pixel size is selected for the CCD sensor and the control/sensing electronics are implemented so that they can process if necessary the full resolution in the shortest required time, a single and same sensor system is then capable of implementing all different applications using the minimum pixel size resolution and coarser resolutions, obviously as multiples of the pixel size, as programmed by the desired sensor configuration.

The table below gives a few practical examples of the principal imaging properties of radiography equipment implemented with a CCD sensor of 30 $\mu$m×30 $\mu$m pixel size. In the table, the abbreviation Bin refers to the sensor "binning" ratio, Pix eff refers to the dimensions of the "binned" square pixel in $\mu$m, and lp/mm refers to the imaging resolution as line-pairs per millimeter.

| Bin | Pix eff | lp/mm | Rel. dose | Application |
| --- | --- | --- | --- | --- |
| 1 × 1 | 30 | 17 | 100 | Magnification mammography |
| 2 × 2 | 60 | 8.5 | 25 | Mammography |
| 3 × 3 | 90 | 5.6 | 11 | Dental panoramic |
| 4 × 4 | 120 | 4.2 | 6.3 | Dental panoramic |
| 5 × 5 | 150 | 3.3 | 4.0 | Dental panoramic |
| 6 × 6 | 180 | 2.7 | 2.8 | |
| 7 × 7 | 210 | 2.4 | 2.0 | Cephalography |
| 8 × 8 | 240 | 2.0 | 1.6 | Cephalography |

As is evident from the table above, a single and same CCD sensor system and its control system block 17 may advantageously be used for implementing at least three different types of imaging systems. By applying the invention to a mammography apparatus, the programmable configuration according to the invention of imaging sensor makes it possible to expose both normal and magnification radiographs without the need for separate mechanical magnification accessories, whereby the manufacturing costs of the radiography apparatus are essentially lower and the use of the apparatus is made easier.

When the TDI-mode imaging technique explained in the introductory part of the application description is used in conjunction with the invention, the object being imaged moves past the imaging CCD sensor at a speed known in real time by the control electronics block 17 and represented by the SYNC signal in FIG. 1, and the motion direction of the object is the same as the transfer direction A of charges into the serial shift register 12 of the sensor. Now, when the charges of the imaging element matrix 10 are transferred with a speed essentially synchronized with the motion speed of the image formed from the moving object onto the sensor photoplane, a sharp image of the moving object can be recorded.

Herein, it must be noted that due to certain physical constraints such as the doped walls between the active areas of the pixel wells, the pixel charges of the sensor can be transferred only by one inter-pixel distance at a time, that is, by the length of a single inter-pixel distance or a multiple thereof. Transfer of charges from one pixel wall to the adjacent one on the sensor area must be performed at a physical speed essentially higher than that of the object image on the sensor photoplane in order to make it possible to transfer the set of pixel charges, which is temporarily stored in the serial shift register, out from the sensor matrix, convert the signal and store it before the next transfer cycle is initiated. However, since the object being imaged generally moves at a constant speed, contrary to the stepped transfer of charges in the sensor, this differential asynchronism between the two motion speeds causes in the motion direction an image blur with a worst-case value of half the inter-pixel distance in the motion direction. In FIG. 7 is shown the sensor integration time tI, after which the pixel charges under control of the synchronizing signal SYNC are transferred timed by the IØx clock signals over one column of the sensor, and then the serial shift register 12 is read at instant Ro with the help of the RØx clock signals.

In the case shown in FIG. 6, the object moves at a constant speed relative to the sensor with the sensor being "binned" over five (5) pixels. As shown in graphs A1–A6 of the diagram, the sensor charges are transferred in discrete steps always over the length of a full "binned" pixel cluster at a time, while in graphs B1–B6 the charge transfer occurs in steps of a single physical pixel length. From the graphs of FIG. 6 it can be seen that the object O being imaged according to binning scheme A is overlaid, besides on the five-fold "binned" pixels p1 of the sensor 18, also extending on its neighbouring pixel p2, whereas imaging according to binning scheme B occurs only onto the single-binned pixel p1 of the sensor 18', whereby the motion-direction image blur is avoided.

In an embodiment based on the second basic method and apparatus according to the invention, in which the physical pixel size of the sensor is smaller than the required maximal resolution, the above-described motion-direction image blur may be reduced by virtue of an embodiment based on the second method and apparatus according to the invention, whereby the pixel charges are not transferred in lengths of the "binned" pixel cluster when using the first method and apparatus according to the invention, but instead in lengths of the physical pixel of the sensor. Then, the tracking of the object motion occurs with maximum accuracy. With a sensor 18' of, e.g., 30 $\mu$m pixel size programmed for with 150 $\mu$m imaging resolution, the binning scheme is carried out in the vertical direction as described above, but the horizontal binning is performed differently. Here, the pixel charges of the of the imaging element matrix 10; 11 are not transferred by the number defined by the HBx input signals into the serial shift register 12 at once, followed by the read-out of the serial shift register 12, but instead, the charges of the imaging element matrix 10; 11 are transferred into the serial shift register 12 always by a column at a time, until the number of columns defined by the input signals HBx are transferred therein, and only thereafter, the read-out of charges from the serial shift register is carried out in the normal manner. This operating mode is selectable by the BM input signal of the control electronics block 17.

In the above-described example, the motion-direction blur in the image is only 30 μm, instead of 150 μm as would be in normal binning, whereby a vast improvement in image blur is attained. By virtue of using the free binning scheme according to the invention and a sensor with a resolution higher than the maximum resolution required by the application in the embodiment described above, it is possible to perform TDI-mode imaging with an accuracy not available by any other means. In practical tests, this approach has been found to give a significant improvement of the imaging quality.

In all the above-described embodiments of the invention, the charges are stored in the serial shift register 12 so long that all the columns to be binned are summed into the register, and thence, the read-out of the serial shift register 12 can be started. Unfortunately, this arrangement causes a dark current component, because the charges stored in the serial shift register 12 cannot be separated from each other by potential walls as is possible for the imaging element, but instead the charges stored in the cells of the serial shift register 12 must be kept stationary by holding one of the clock signal lines high, thus forming the required potential well under that clock line.

Prior to the concept of pixel isolation by means of potential walls, the charges of the CCD sensor imaging element matrix were kept stationary using the above-mentioned technique and simultaneously different methods were developed for minimizing the dark current component without resorting to cooling. One of these conventional techniques is called "dithering" in which the potential well of an imaging element is not formed stationary under a single clock signal line, but instead the well is moved continuously alternatingly under the individual clock signal lines of the imaging element, however, keeping the well within the borders of the imaging element proper. This technique is based on the fact that the dark current component does not start growing immediately after the clock signal line is taken high, but instead starts to grow after a short period of time. When the adjacent clock signal line is taken high and the previously activated line is taken down, the dark current component will not reach a significant level provided that the alternation of clock signals is performed at sufficiently high rate and a sufficient recovery time is allocated for each clock signal line.

When the clock signal line is high, its potential causes due to the thermal motion of electrons a leakage current to appear in the pixel well called the dark current (that is, a signal component not induced by radiation incident on the pixel). As the dark current component is strongly dependent on the sensor temperature, it can be lowered by cooling the sensor. If the polarity of the clock signal line is inverted, that is, taken negative with respect to the sensor substrate, the formation of the above-mentioned dark current component is prevented. In fact, this technique is applied today by keeping the pixel charges stationary with the help of static fields made into the sensor body by doping as described above and taking all the clock signal lines negative. However, since the serial shift register 12 is not provided with this facility, its charges must be kept stationary with the help of a potential well formed by a clock signal line taken high, unfortunately involving the formation of a dark current component. This drawback can be alleviated by virtue of the "dithering" scheme employed in a preferred embodiment of the invention.

When a clock signal line is taken negative, the growth of the dark current component will stop immediately, because potential field acts reverse to it, whereby a kind of diode reverse-biased to the dark current component will be formed on the pixel well interface. As the potential of the clock signal line is again taken positive, even as soon as, e.g., a few milliseconds after being taken negative, the dark current will not immediately reach its steady-state level, but instead begins to grow exponentially from a low level as a function of time with a time constant which is inversely proportional to the number of intrinsic charge carriers in the well. Thence, the "dithered" clocking concept is based on keeping the clock signal lines, under which a potential well need not be formed, sufficiently negative to prevent dark current component from forming under them and then alternatingly selecting one clock signal line from the clock signal lines of the pixel to be kept positive as shown in FIG. 8. As only one of the clock signal lines at a time is taken high for a relatively short period of time with respect to the above-mentioned time constant, a significant reduction of dark current formation is attained. In practice, said time constant in CCD sensors is strongly dependent on the sensor temperature, typically being about 10 s at −40° C., 15 ms at 20° C. and 180 μs at 80° C. By keeping each one of the clock signal lines at a time high for less than 10 μs as shown in FIG. 8, the dark current component can be reduced to less than one-thousandth at room temperature.

In an imaging element matrix, the conventional "dithered" clocking scheme can be applied to a preferred embodiment of the invention having the serial shift register 12 operated in the above-described manner. Here, the dark current component may be eliminated practically entirely. Hence, in accordance with the preferred embodiment of the invention, at time instant Ro of FIG. 7 the serial register 12 is either read at a due point of the clocking scheme, and for the other time during the subsequent integration period, the register is subjected to "dithering". In FIG. 8 is shown an example of the clock signals for a three-phase-clocked serial register 12 during the "dithering" time, with the timing periods typically set so short as to prevent the formation of the dark current component.

A problem herein is that this self-timed "dithering" scheme cannot be synchronized by any means to the charge transfer intervals of the imaging element matrix that occur in a random manner with respect to the operation of the control electronics block 17 and that, in order to maximize the transfer efficiency of charges, the transfer clock signals of the serial shift register 12 must be in a certain state always when the charges of the imaging element matrix 10 or the storage matrix 11, respectively, are being transferred into the serial shift register 12. This problem can be overcome by driving the clock signals of the serial shift register 12 to their correct states in a controlled manner during the time the charges of the imaging element matrix 10 or the storage matrix 11, respectively, start to move into the serial shift register 12. As can be seen from FIG. 7, when the SYNC signal goes high, the IØx clock signals of the imaging element matrix go through the sequence required to perform the charge transfer, during which time the clock signals of the serial shift register 12 must be driven into their correct states before the charges are transferred into the serial shift register 12, which step actually occurs only at phase V 14 of the sequence. In FIG. 9 is shown the control of some "dithering" clock signals typical for a three-phase-clocked sensor from any state into the charge-transfer sequence state during a sufficiently short period of time. In the charge-transfer state, the serial clock signal lines 1 and 2 are held high to keep the potential well formed thereunder at maximum potential, while simultaneously the clock signal line 3 is kept at zero potential to prevent the charges of the different columns from interacting with each other.

With regard to the "dithered" clocking method advantageously applied in conjunction with the present invention, reference is made the following publications:

"DEVELOPMENT OF X-RAY CCDs", Burt D. J., GEC-Marconi Limited, Hirst Research Centre, and EEV Ltd, Chelmsford; Proceedings of an ESA Symposium on Photon Detectors for Space Instrumentation, held at ESA/ESTEC Noordwijk, The Netherlands, 10–12 Nov. 1992. (ESA SP-356 December 1992).

"Dynamic suppression of interface state dark current in buried channel CCDs", Burke B. and Gajar S. A., IEEE Trans. Electron Devices, Vol. ED38-2, 1991.

Referring to FIG. 10, therein is shown a panoramic x-ray apparatus principally intended for dental radiography, said apparatus being comprised of a vertical column 20 carrying a horizontal support arm 21, adapted vertically movable by means of a motor 25 and rotatable by means of a motor 24, said horizontal support arm carrying at its one end an x-ray generator 22, whereby a narrow x-ray beam 26 emitted by the generator passes through the tissues of a patient P from one side and is on the other side incident on a sensor head 23 comprising a CCD sensor system according to the present invention which is freely configurable within given limits under program control.

Referring to FIG. 11, therein is shown a mammography apparatus suitable for acting as an application platform for the invention, said apparatus being mounted on a base 30. To the base 30 is attached a fixed vertical column section 32 housing a lift motor 31 by means of which a movable vertical column section 38 can be telescopically elevated/lowered inside the fixed column section. The vertical column section houses a motor 33 for rotating a C-arm 44 about a horizontal axis H—H. One end of the C-arm 44 supports an x-ray source 42, while the other end of the arm carries a shelf-like lower breast support 36 against which a breast M to be radiographed is compressed with the help of a compressing upper support 43 actuated by a motor 34. During the exposure of the breast M, a narrow x-ray beam 41 emitted by an x-ray tube 39 passes through a primary blind, which is adapted laterally movable by means of a motor 40, then passes through the breast M being radiographed and finally is incident on a sensor head 45, which is adapted simultaneously movable with the primary blind by means of a motor 35, said sensor head including a CCD sensor system of the above-described type according to the present invention which is freely configurable within given limits under program control.

Referring to FIG. 12, therein is shown a chest fluoroscopy apparatus in which an x-ray source 74 emits a narrow x-ray beam 73 that passes through the chest of a patient P and impinges on a sensor 72. During the exposure, the x-ray source 74 and the sensor 72 are moved in the vertical direction by means of a motor 70. The sensor 72 is a CCD sensor system of the above-described type according to the present invention which is freely configurable within given limits under program control.

All the apparatuses exemplified above operate using the slit blind exposure arrangement, which must not be understood to be limiting to the applications of the invention. For instance, the apparatus shown in FIG. 11 can operate using the normal fluoroscopy principle in which the entire chest M is viewed at once, whereby the CCD sensor according to the invention may have dimensions equal to those of the lower breast support or at least be a large-area matrix CCD sensor system of the above-described type according to the present invention which is freely configurable within given limits under program control.

In FIG. 13 is diagrammatically shown a control system 80 according to the first embodiment of the imaging apparatus according to the invention, into which system the user enters via the keypad of a control panel 81 the exposure parameters required for any desired imaging configuration. On the basis of these user-entered parameters and preset data stored in a parameter memory 82, the control system 80 sends the most appropriate sensor system settings to the control electronics block 17 (FIGS. 1 and 2) by means of signals VBx, HBx and BM. During the exposure, the control system 80 synchronizes the operation of the sensor system by the START and SYNC signals with the other functions of application platform, from whose multiple actuators in FIG. 13 are schematically shown motors 83 and 84 that may be, e.g., the C-arm rotating motor of a panoramic radiography apparatus (motor 24 in FIG. 10) or the actuator motors of the primary blind and imaging sensor in a mammography apparatus (motors 35 and 40 in FIG. 11).

In FIG. 14 is shown a combination panoramic radiography/cephalography apparatus having a construction otherwise equivalent to that illustrated in FIG. 10 except that to the apparatus is attached a horizontal arm 27 carrying at its one end for cephalography a slit-imaging camera 28, to which is applied a CCD sensor system of the above-described type according to the present invention which is freely configurable within given limits under program control.

Figures 15A, 15B:
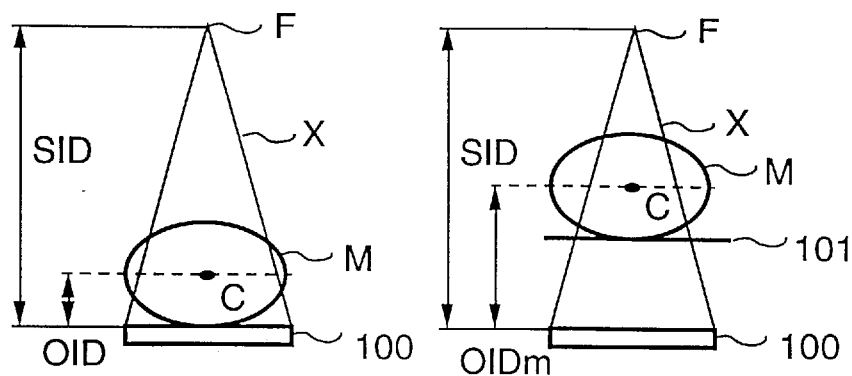
FIG. 15A is a geometric diagram illustrating mammography in making a contact radiograph.
FIG. 15B is a geometric diagram equivalent to that of FIG. 15A, here illustrating mammography in making a magnification radiograph.

Conventionally, mammography exposures are made using the arrangements shown in FIGS. 15A and 15B. In FIG. 15A is illustrated the so-called contact exposure, in which the breast M to be radiographed is compressed essentially flat against an imaging medium 100 and an object C in the breast is imaged with the help of an x-ray beam onto the imaging medium 100 with a magnification, whose value using the notations of FIGS. 15A and 15B can be computed from the formula:

$$M = \frac{SID}{(SID - OID)} \quad (1)$$

In practice the thickness of compressed breast M is 45 mm, whereby the contact exposure geometry of FIG. 15A gives a magnification of slightly above one for the object C to be imaged approximately in the midpoint of the breast. In an imaging geometry having the distance SID of the x-ray source focus F from the imaging medium 100 set at 65 cm, a magnification value of 1.036 is attained.

For closer examination, mammography is performed using so-called magnification exposures in which the details of the object are visible in greater detail. The exposure geometry is illustrated in FIG. 15B. Now the breast M being imaged is not compressed against the imaging medium 100, but instead against a magnification support 101 located above it. According to the preceding example with the distance OIDm now set to 32.5 cm, a magnification value of 2.0 is attained, whereby the dimensions of the image of the object C on the imaging medium 100 are twice as large as those obtained in the previous example.

However, the geometry shown in FIG. 15B also has drawbacks. When the object M is brought closer to the x-ray tube focus F, the radiation dose imposed on the object obeys the square law of distance, whereby a radiation dose in the illustrated case increases to a four-fold value. Moreover, the finite size of the x-ray tube focus F begins to affect the imaging accuracy in a deteriorating manner. The imaging process can be evaluated with the help of the modulation transfer function (MTF) by computing this function for a square focus spot from the formula:

$$MTF(Ug, v) = \left| \frac{\sin(\pi \cdot v \cdot Ug)}{\pi \cdot v \cdot Ug} \right|, \quad (2)$$

where $$Ug = \frac{(M-1) \cdot F}{M} \quad (3)$$

The factor M is the magnification and F is the size of the x-ray tube focus spot, which in mammography apparatuses typically is 0.3 mm in contact exposures and 0.1 mm in magnification exposures.

Figure 16:
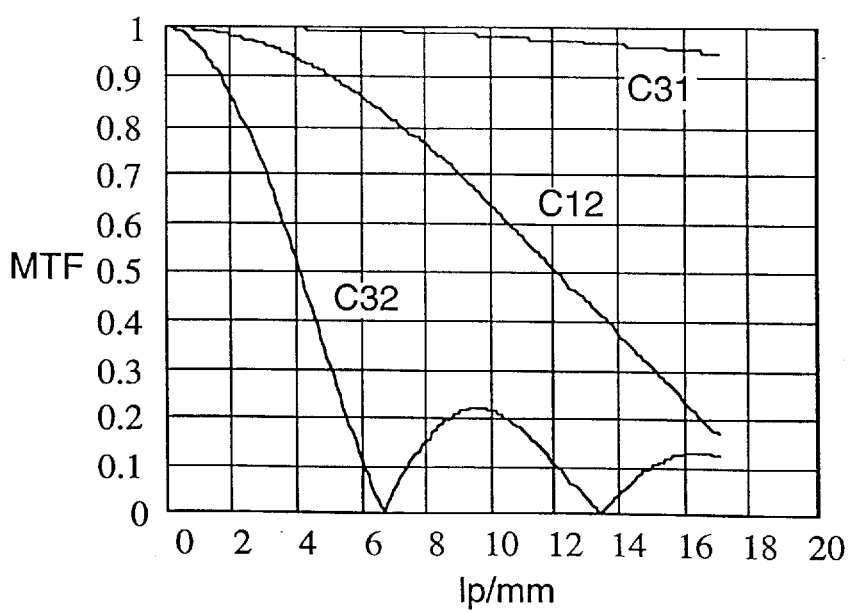
FIG. 16 is a plot of modulation transfer functions (MTF) for different discrete values of focus size used in different applications of mammography.

In FIG. 16 is shown a plot of MTF curves with a finite size of the focus spot for different exposure arrangements. Imaging resolution for contact exposure with 0.3 mm focus size is shown in graph C31, and using the same focus size, in graph C32 for magnification exposure with a magnification value of 2. From FIG. 16 can be seen that the resolution of the magnification exposure falls off at approx. 6 lp/mm, which cannot be considered sufficient under any conditions. Due to such a drawback, conventionally a smaller focus size of 0.1 mm is used in magnification exposures. For this focus size and magnification value of 2, the resolution of a magnification exposure is shown in FIG. 16 by graph C12, wherefrom an appreciable increase of resolution with regard to graph C32 is evident. However, as can be seen from FIG. 16, the magnification resolution remains inferior to the resolution of graph C31 representing contact exposure resolution with 0.3 mm focus, and in fact, the usability of magnification exposure is related to the weakest element of the imaging arrangement, which is the film-intensification screen combination, whose MTF is shown in graph FS of FIG. 17. Here, the magnification improves the resolution performance of the film-intensification screen combination so much that, in spite the unsharpness caused by the longer distance from the tube focus, the final resolution in magnification exposures remains higher than that of contact exposures.

Figure 17:
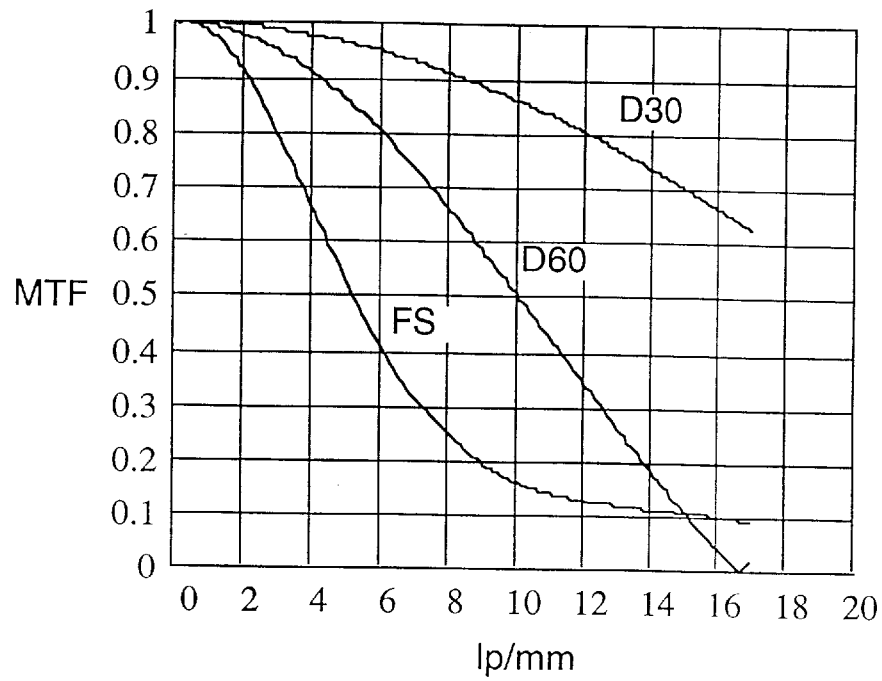
FIG. 17 is a plot of modulation transfer functions similar to that of FIG. 16, here illustrating the resolution achievable by different types of imaging means.

In FIG. 17 are plotted the modulation transfer functions of different imaging media. The resolution of a digital CCD image sensor is shown in graph D30 for 30 $\mu$m pixel size and in graph D60 for 60 $\mu$m pixel size, respectively. Graph FS represents the resolution of a modern film-intensification screen combination. The MTF of the digital imaging sensor is computed from the formula:

$$MTFc(i) = \left| \frac{\sin(\pi \cdot i \cdot p)}{\pi \cdot i \cdot p} \right| \quad (4)$$

where p is the pixel size in micrometers. FIG. 17 makes the superior resolution performance of a digital imaging sensor undeniably evident.

The overall resolution of the entire imaging system can be obtained by taking the product of the modulation transfer functions of its subsystems, whereby in the present case the focus spot modulation transfer function is multiplied with the transfer function of the imaging means:

$$MTFtot(i) = \left| \frac{\sin(\pi \cdot i \cdot p)}{\pi \cdot i \cdot p} \right| \cdot \left| \frac{\sin(\pi \cdot i \cdot Ug)}{\pi \cdot i \cdot Ug} \right| \quad (5)$$

Figure 18:
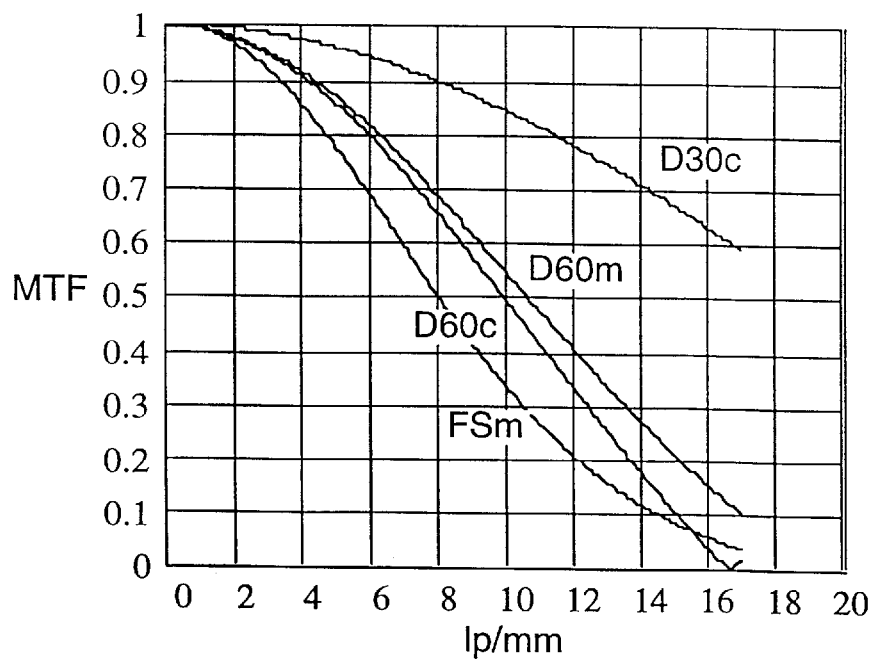
FIG. 18 is a plot of modulation transfer functions similar to those of FIGS. 16 and 17, here illustrating the overall resolution performance of the entire imaging system in different types of applications.

In FIG. 18 are shown the modulation transfer functions computed from the formula above for the exposure values given in the table below, and for comparison, also the resolution of a film is shown in the plot.

| Graph | Focus | Magnification | Pixel size |
|-------|-------|---------------|------------|
| D60c  | 0.3   | 1.04          | 60 $\mu$m  |
| D60m  | 0.1   | 2.00          | 60 $\mu$m  |
| D30c  | 0.3   | 1.04          | 30 $\mu$m  |
| FSm   | 0.1   | 2.00          | Film with intensification screen |

From FIG. 18 is immediately evident that using a sensor according to the invention with a freely configurable pixel size and making a "magnification" exposure as a contact exposure using a smaller pixel size, an appreciably higher resolution can be attained than what is possible in conventional magnification exposures using a conventional fixed pixel size. The only difference between graphs D30c and D60m is caused by the difference between the modulation transfer functions representing the 0.3 mm focus used in contact exposures and the 0.1 mm focus used in magnification exposures, because the modulation transfer function of the sensor remains the same in both cases. Herein, it must be borne in mind that the imaging resolution of the sensor in contact exposures with 30 $\mu$m pixel size is equivalent to 60 $\mu$m pixel in magnification exposures with an object magnification of two.

In addition to the benefit of improved imaging resolution, in comparison to conventional magnification exposure methods based on a fixed pixel size, which is made possible through the variable sensor resolution of the method according to the invention, also a simpler and less costly x-ray source of a single focus size only can be used.

Herein, it must be noted that a focus spot of 0.1 mm on the x-ray tube anode plate is by its physical area much smaller than a 0.3 mm focus spot and thus can be loaded with a power level of only 20% of that permissible for the larger 0.3 mm focus spot. Thus, the smaller focus necessarily requires longer, about five-fold exposure times in the imaging of comparable objects and is more likely to cause motion blur in the image if the patient moves during the exposure.

Since the area of a 30 $\mu$m pixel is only a quarter of the 60 $\mu$m pixel area, in principle the 30 $\mu$m pixels require a four-fold radiation dose onto the imaging sensor in order to achieve the same sensor output signal level as with the larger pixels, which radiation dose is exactly the same as required for magnification exposures using a conventional imaging method. However, because the radiation passed through the object and attenuated therein need not in the method according to the invention to travel but for a very short distance in air prior to impinging on the imaging means, as compared with the situation in a conventional magnification exposure, the air attenuation of the x-rays remains insignificant, whereby in practice a lower radiation dose will be required as compared to a conventional imaging method.

A further benefit of the mammography application of the present invention is therein that by making "magnification" exposures with a smaller pixel size and using contact exposure, also "magnification" exposures over the entire image area can be made if required Hereby, the drawback of conventional techniques is eliminated that if the object is taken closer to the x-ray tube, e.g., a magnification of 2 makes the image on the imaging medium so large that only one quarter thereof can be recorded.

Not being limited by the above-described exemplifying preferred embodiments, the details of the invention may be varied and deviated within the scope and inventive spirit of the annexed claims.

I claim:

1. A method of imaging an object with electromagnetic radiation wherein radiation reflected from or transmitted through an object (O;P;M) is detected by an imaging sensor system capable of delivering an electrical output signal conveying the image information obtained from the object (O;P;M) and including a solid-state sensor matrix comprised of a row-and-column arrayed plurality of picture imaging elements, each element producing a charge responsive to detected radiation, comprising the steps of:

configuring the imaging sensor system by combining a plurality of the imaging elements along at least one of the rows or columns of the sensor matrix so as to define clusters of imaging elements;

combining charges which represent the image information obtained from the individual imaging elements of said clusters in charge form to produce an electrical signal corresponding to the combined charges for the cluster for further processing; and determining the number of imaging elements in the cluster in response to external control on a case by case basis so as to configure the cluster size according to the needs of each individual exposure, thereby performing for each exposure a mutual optimization between the resolution and sensitivity of the sensor.

2. The method as defined in claim 1, further comprising:

dimensioning the pixel size of the CCD sensor to be in the order of 20–50 μm by 20–50 μm;

selectably controlling the configuration of the CCD sensor and combining of pixels into clusters so that in a mammography apparatus the combined cluster size is from 1×1 pixels to 2×2 pixels, so that magnification mammography is performed using the maximum available resolution without binning and the normal contact mammography is performed using a binned cluster size of 2×2 pixels;

using the same imaging sensor system in dental panoramic radiography by selectable combining the pixels within a cluster size of 3×3 pixels to 6×6 pixels; and using said dental panoramic radiography apparatus in cephalography by selectably combining said CCD sensor pixels within the cluster size of 6×6 to 8×8 pixels.

3. The method as defined in claim 1, comprising the steps of:

applying a TDI-mode imaging technique whereby a relative mutual movement occurs between the object to be imaged and the imaging sensor:

transferring the charge-mode image, formed on the imaging elements, at the same speed with the relative movement and accumulating for a predetermined time the image information gathered from the object;

selecting the physical size of the imaging elements to be smaller than that required to achieve the predetermined maximum resolution required from the sensor matrix; and reducing the image blur caused by the relative movement between the object and the imaging sensor by shifting the pixel charges in synchronized steps corresponding to the physical size of the imaging elements, whereby the tracking of the relative movement occurs with maximum accuracy.

4. The method as defined in claim 1, wherein an analog output signal obtained from the imaging sensor system is converted into digital format suitable for visualization by conventional display means or storage in digital format on conventional storage means.

5. An apparatus for imaging an object, comprising:

means for emitting electromagnetic radiation onto the object to be imaged;

an imaging sensor system comprising a solid-state sensor matrix incorporating a row-and-column arrayed plurality of pixels;

means for detecting and storing the electrical output signal of said imaging sensor system;

a CCD imaging sensor system with a control system and operative for providing a mutual, relative movement between the object to be imaged and said sensor system, and further operative to transfer the charge-mode image formed from the object to be imaged on the CCD sensor elements at the same speed with said relative movement as between the object to be imaged and the sensor system;

the physical pixel imaging element size of the sensor being smaller than that required to achieve the predetermined maximum resolution required from the sensor; and means operative to reduce the image blur caused by the relative movement between the object to be imaged and the imaging sensor by shifting the pixel charges in synchronized steps corresponding to the physical size of the CCD sensor pixels, whereby the tracking of the relative movement between the object to be imaged and the CCD sensor occurs with maximum accuracy.

6. A method of imaging an object with electromagnetic radiation reflected from or transmitted through an object (O;P;M) and detected by an imaging sensor including a solid-state sensor matrix comprised of a row-and-column arrayed plurality of picture imaging CCD sensor elements each producing an electrical charge responsive to detected radiation, comprising the steps of:

applying a TDI-mode imaging technique whereby a mutual relative movement occurs between the object to be imaged and the imaging sensor;

transferring the charge-mode image, which is formed from the object to be imaged on the sensor elements, at the same speed with said relative movement and accumulating the image information gathered from the object for a predetermined time simultaneously achieving an increased sensitivity of the sensor;

selecting the physical size of each sensor element to be smaller than that required to achieve the maximum resolution required from the sensor matrix; and reducing the image blur caused by the relative movement between the object to be imaged and the imaging sensor by shifting the charges of individual sensor elements in synchronized steps corresponding to the physical size of the sensor elements, whereby the tracking of the relative movement between the object to be imaged and the CCD sensor occurs with maximized accuracy.

7. The method as defined in claim 6, wherein:

the pixels sensor are combined into larger clusters along at least one of the rows and columns of the sensor matrix;

said combining in the horizontal direction of the matrix occurs by transferring into a serial shift register (12) the charges of a plurality of imaging element rows, and then reading out from the imaging system the charges transferred and summed into the serial shift register, whereby the charges of a plurality of imaging elements are summed; and summing the charges in the vertical direction of the sensor is carried out by first clearing an output well (13) of the imaging sensor system and then transferring therein the contents of charge wells of a plurality of the serial shift registers (12) before sensing the sensor output voltage.

8. The method as defined in claim 7, wherein the combining of pixel charges in the vertical direction is performed by sensing from the output signal the charge zero-offset level of the output well (13) after first clearing the output well by applying a clear pulse (ØR) in response to a signal (CDS) applied at a suitable instant (ZO), and then summing the pixel charges into said output well (13) at certain instants, and subsequently sensing the image sensor output signal under control of a signal (SH) and clearing the output well (13) for the next output sensing operation.

9. The method as defined in claim 7, wherein a control electronics block (17) is controlled by input signals (VBx), under the control of which the number of pixel charges defined by said input signals (VBx) is transferred into said output well (13), after which said output signal is sensed.

10. The method as defined in claim 7, wherein if the length of the serial shift register (12) is not integrally dividable with the defined number of pixels to be combined, a control electronics block (17) commands a number of empty pixel charges which is equal to the division remainder to be summed into the last sample of the output signal, whereby row synchronization will not be lost.

11. A method as defined in claim 7, wherein:
the vertical-direction pixels of the imaging sensor system are combined in response to an input signal of the imaging sensor system by selectably grouping pixels along the columns of the sensor matrix into clusters of a plurality of pixels, and combining the charges representing the image information from the individual pixels of the clusters to form an electrical signal for further processing;
the horizontal-direction combining of pixel charges is carried out by transferring the charges of the imaging element matrix (10) into the serial shift register (12) always by a column at a time, until a predetermined number of columns defined by the input signals (HBx) is transferred therein, and only thereafter;
reading out the charges from the serial shift register (12) is carried out in the normal manner.

12. The method as defined in claim 7, wherein the serial shift register (12) is subjected to dithering at times when the contents of the shift register are not being read, whereby a dark current component of the charge wells of said serial shift register (12) is substantially eliminated.

13. The method as defined in claim 12, each of said serial shift registers (12) is read in turn and during other instants of time a dithered-clocking signal is applied to the operation of said serial shift register (12), and the clock cycle steps of the dithering are made so short by virtue of the clocking signals of the serial shift register (12) that the dark current component is substantially eliminated.

14. The method as defined in claim 12, wherein the clock signals of the serial shift register (12) are driven to their correct states in a controlled manner during the time the charges of the imaging element matrix (10; 19) start to move into the serial shift register (12), and clock signals (IØ$_x$) of the imaging element matrix go through the sequence required to perform the charge transfer, during which time the clock signals of the serial shift register (12) are driven into their correct states before the charges are transferred into the serial shift register (12).

15. The method as defined in claim 9, further comprising:
using the method with a control system (80) into which the user can enter the exposure parameters required for any desired imaging configuration, said parameters defining via control signals (VBx, HBx, BM) the most appropriate imaging sensor settings to the control electronics block (17) of the CCD sensor system, and during the exposure using said control system (80) to synchronize the operation of the imaging sensor system in response to control signals (START, SYNC) with other functions of radiography apparatus.

16. An apparatus for imaging an object, comprising:
means for emitting electromagnetic radiation onto the object to be imaged:
an imaging sensor system comprising a solid-state sensor matrix incorporating a row-and-column plurality of pixels producing charges in response to the radiation received by the pixels, and said apparatus further including;
means for detecting and storing the electrical output signal of said imaging sensor system;
control means for said imaging sensor system selectably operative to combine the charges of plural pixels receiving images from different portions of the object being imaged, along rows or columns of sensor matrix, into clusters of pixels and to transfer the charges which represent the image information obtained from combining the individual pixels of said clusters to the means for detecting, so as to produce signals corresponding to the combined charges from the different portions of the object.

17. The apparatus as defined in claim 16, including a control system (80) incorporating a control panel (81) via which the user can enter the exposure parameters required for setting the imaging sensor system for any desired imaging configuration.

18. The apparatus as defined in claim 16, wherein the imaging sensor used in the apparatus is a CCD sensor and said means for emitting electromagnetic radiation is an x-ray source.

19. An apparatus as defined in claim 18, characterized in that said apparatus is applied to a mammography apparatus (FIG. 11) equipped with an x-ray source, to a dental panoramic radiography apparatus (FIG. 10), to a combination apparatus for dental panoramic radiography/cephalography (FIG. 14) or to a chest fluoroscopy apparatus (FIG. 12) so that a conventional film-cassette recording medium is replaced by the imaging sensor system according to the invention.

20. The apparatus as defined in claim 16, further comprising:
a serial shift register (12) operative to receive the combined charges of the selected plurality of pixels and read out the charges transferred and summed into the shift register, whereby the charges of the plurality of pixels are summed; and
means operative to subject the shift register to dithering at times when the contents of the shift register are not being read, whereby the dark current component of charge wells of said serial shift register (12) are substantially eliminated.

* * * * *